(12) United States Patent
Qiu et al.

(10) Patent No.: US 8,689,727 B2
(45) Date of Patent: Apr. 8, 2014

(54) ANTI-OXIDATION SPRAY METHODS AND SPRAY EQUIPMENT FOR STEEL BILLETS

(75) Inventors: Jianping Qiu, Dalian (CN); Dejun Zou, Dalian (CN); Zhihai Wei, Dalian (CN); Mingzhi Zhu, Dalian (CN); Meng Xu, Dalian (CN); Zhiqian Jia, Dalian (CN); Shufeng Ye, Beijing (CN); Lianqi Wei, Beijing (CN)

(73) Assignee: Dalian RINO Group Co., Ltd., Dalian, Liaoning Province (CN)

( * ) Notice: Subject to any disclaimer, the term of this patent is extended or adjusted under 35 U.S.C. 154(b) by 1122 days.

(21) Appl. No.: 12/261,030

(22) Filed: Oct. 29, 2008

(65) Prior Publication Data

US 2009/0101736 A1 Apr. 23, 2009

Related U.S. Application Data

(63) Continuation-in-part of application No. PCT/CN2007/001475, filed on Apr. 29, 2007.

(51) Int. Cl.
*B05C 5/00* (2006.01)
*B05B 7/04* (2006.01)
*B05B 15/08* (2006.01)
*B05B 15/10* (2006.01)

(52) U.S. Cl.
USPC .......................... 118/315; 118/314; 118/316

(58) Field of Classification Search
USPC ................................. 118/314, 315
See application file for complete search history.

(56) References Cited

U.S. PATENT DOCUMENTS

| | | | | |
|---|---|---|---|---|
| 3,885,066 A | * | 5/1975 | Schwenninger | 118/314 |
| 4,096,300 A | * | 6/1978 | William et al. | 118/314 |
| 4,752,497 A | * | 6/1988 | McConkey et al. | 427/195 |
| 4,830,882 A | * | 5/1989 | Ichinose et al. | 118/302 |
| 5,230,739 A | * | 7/1993 | Bartow | 118/694 |

(Continued)

FOREIGN PATENT DOCUMENTS

| | | |
|---|---|---|
| CN | 1071705 | 5/1993 |
| CN | 1864868 | 11/2006 |

(Continued)

OTHER PUBLICATIONS

International Searching Authroity, "Written Opinion of the International Searching Authority," issued in connection with international application serial No. PCT/CN2007/001475, mailed Jan. 3, 2008, 11 pages.

(Continued)

*Primary Examiner* — Dah-Wei Yuan
*Assistant Examiner* — Stephen Kitt
(74) *Attorney, Agent, or Firm* — Hanley, Flight & Zimmerman, LLC.

(57) ABSTRACT

The examples described herein provide methods and equipment for an anti-oxidation spraying on a steel billet. In some examples, when the billet at the temperature of 400° C.-1000° C. enters the predetermined spraying region, a plurality of anti-oxidation spraying devices are used to perform an anti-oxidation spray on the billet in two or more directions, thereby forming directly an anti-oxidation coating on the steel billet at 400° C.-1000° C. By using the example method and equipment described herein, on-line spraying of anti-oxidation coating on the steel billet can be performed under high-temperature condition, thereby reducing an oxidation burning loss rate of the steel billet.

34 Claims, 8 Drawing Sheets

(56) References Cited

U.S. PATENT DOCUMENTS

| | | | |
|---|---|---|---|
| 5,280,433 A * | 1/1994 | Ettinger et al. | 118/669 |
| 5,725,668 A * | 3/1998 | Foster et al. | 118/411 |
| 2006/0124776 A1 | 6/2006 | Nomura et al. | |

FOREIGN PATENT DOCUMENTS

| EP | 0045207 | 2/1982 |
|---|---|---|
| EP | 45207 A1 * | 2/1982 |
| JP | 58077523 | 5/1983 |
| JP | 7299546 | 11/1995 |
| JP | 2004255407 | 9/2004 |
| WO | 2004085082 | 10/2004 |

OTHER PUBLICATIONS

International Bureau, "International Preliminary Report on Patentability," issued in connection with international application serial No. PCT/CN2007/001475, issued Nov. 3, 2009, 13 pages.

International Searching Authority, "International Search Report," issued in connection with international application serial No. PCT/CN2007/001475, mailed Jan. 3, 2008, 8 pages.

* cited by examiner

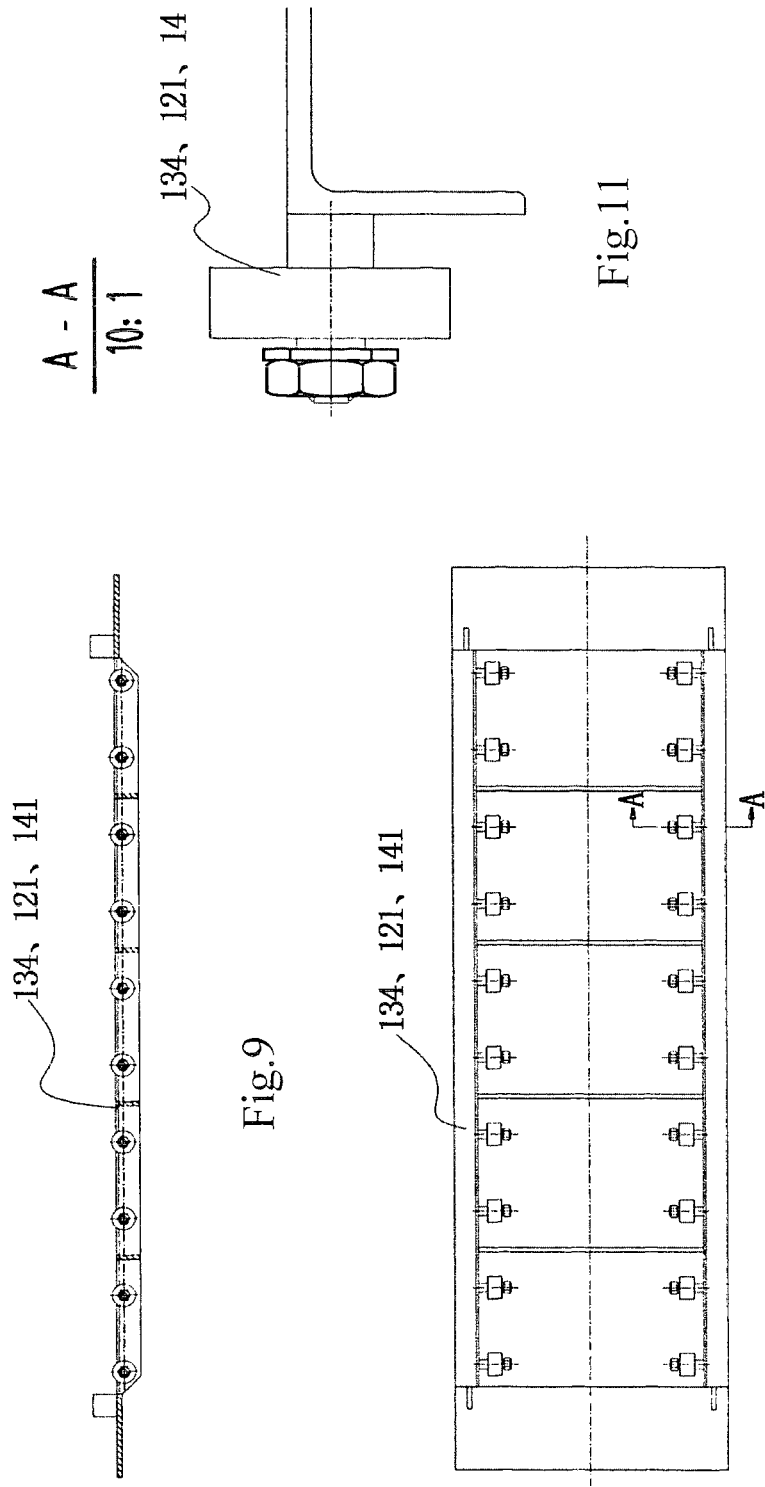

ANTI-OXIDATION SPRAY METHODS AND SPRAY EQUIPMENT FOR STEEL BILLETS

CROSS REFERENCE TO RELATED APPLICATION

This patent is a continuation-in-part of International Patent Application Serial Number PCT/CN2007/001475, entitled "Anti-oxidation Spray Method and Spray Equipment for Steel Billets," filed Apr. 29, 2007, which is incorporated herein by reference in its entirety.

TECHNICAL FIELD

The present disclosure generally relates to spray methods and spraying equipment, and particularly, to anti-oxidation spray methods and spraying equipment for steel billets during the production thereof.

BACKGROUND ART

A conventional hot-rolling process of a steel plate involves mainly billet reheating, hot-rolling and curling. During the heating process, the steel billet is heated to necessary temperature by burning natural gas in a reheating furnace. Because of the severe oxidation atmosphere of the environment, a thick oxidation scale (normally several mm thick) will be formed on the billet surface during the heating process. The oxidation scale is called as a primary oxidation scale and can be removed by a hydraulic descaler near the reheating furnace exit.

On the transfer stage during rough rolling process, more scales will be formed on the steel surface. The formed scales are removed by high-pressure water in every or some passages. Normally, it takes 7 or more passages to complete the rough rolling. Then, "an intermediate billet" having a thickness of 19-45 mm (mostly between 20 and 30 mm) will be formed after hot rolling. Then the billet is subject to finish rolling. The oxidation scale formed during and after the rough-rolling is called "a secondary oxidation scale," and is removed by another hydraulic descaler at the entrance of a finish rolling machine. The intermediate billet is rolled into a sheet having a thickness of 1.2-12 mm (mostly between 2.0 and 4.5 mm) by the finish rolling machine. "A tertiary oxidation scale" will be formed on the steel surface during and after the finish-rolling process, and will be curled together with a strip steel and kept to room temperature. During the cooling process after curling, because of the existence of oxygen in the environment, the scale will keep on growing, thus its structure will change accordingly.

According to statistics, during the production in metallurgical enterprises, the oxidation burning loss reaches 0.5-2.5% because of high-temperature oxidation of the steel surface after each heating. In the mechanical manufacture, the loss is about 5% of the billet weight during forging. In the heating process, when furnace gas or temperature is not appropriately controlled, or the billet stays too long in high-temperature zone, especially when temperature is not adjusted in time in case of rolling failure, the thickness of scale will increase, normally to 1-5 mm or even 10 mm.

The ferric oxide scale due to high temperature oxidation directly causes loss to steel output and quality. Meanwhile, if the ferric oxide scale is not removed in time, it will be pressed into the billet surface during rolling, and cause product surface defects or even product scrap in case of severity. The formed ferric oxide scale makes precision forging impossible. In order to remove the ferric oxide scale from the steel billet surface, high-pressure water flushing, pickling and shot blasting apparatus are needed, thus production processes are added and energy consumption is increased. Besides, the ferric oxide scale will fall onto the bottom of the reheating furnace when the steel billet (ingot) is heated, and this not only corrodes the furnace and reduces its life expectancy, but also increases heavy physical work when cleaning the scale, and moreover, it will consume a lot of energy if water is used to remove dregs. During steel heating, the oxidation will not only result in ferric oxide scale, but also cause deficiency and decarbonization of alloy element in the steel at the same time. Changes in steel surface chemistry contents will deteriorate mechanical performance and corrosion resistance properties, thus lowering passing rate of the finished products.

Therefore, appropriately adopting high-temperature anti-oxidation technology, especially high-temperature anti-oxidation coating, enhances the steel yield rate in a certain extent during the production process and directly improves the yield and quality of steel. At the same time, reduction of ferric oxide scale greatly simplifies production processes, so that energy consumption in the production process will be greatly reduced, and iron ore resources will be fully utilized to improve the productivity.

The main factors influencing the high-temperature oxidation of steel include heating temperature, heating time, furnace gas composition, the chemical composition of steel and the ratio of steel heated region and steel weight, and so on. During production in metallurgical factories, adopting rapid heating, control of gas composition and inert gas protection can reduce the oxidation of steel in a certain extent, but there are some technical limitations, in large metallurgical enterprises, the corresponding equipment investments are enormous, and the operability is not ideal. The method of using protective coating is very economical and easy to be operated.

The high temperature anti-oxidation coating requires high temperature resistance, and its main component includes some metal or non-metallic oxides with good high temperature resistance properties. The common preparation method is slurry coating, firstly, the raw materials of various components for the coating are mixed to prepare slurry of good floatability, then the slurry is sprayed or brushed onto the surface of the metal matrix, and the slurry is adhered to the surface and formed a thin layer of slurry, and after being dried in shade, powder in the slurry is formed into a layer of powder coating on the surface of the metal matrix through the binder. In its original state, the coating is porous and not compact, so under atmospheric conditions and room temperature, the atmospheric components of oxidation will diffuse to the surface of the metal matrix through this porous coating and react with the metal to make the metal oxidized.

Therefore, in the original state of the slurry coating at room temperature, high temperature anti-oxidation coating can not serve to protect the metal. When the metal coated with high temperature coating is heated, with the increase of temperature, the coating is gradually dehydrated and dried, then sintered, and the coating thickness becomes thinner, pore size of the coating decreases, porosity decreases gradually and permeability decreases. When reaching the softening temperature of the coating, the coating begins to be softened and melted. The coating porosity sharply decreases and density increases. With further increase of the temperature, the coating melts to the liquid state, and then a dense airtight liquid adhesive layer is formed. Evidently, high-temperature anti-oxidation coating prepared by the slurry coating method experiences two states in the heating process, that is, in short heating and temperature rising period, the coating powder is heated and sintered, and the coating is gradually densified;

and in the longer temperature rising and retaining period, the coating powder melts and is in a melting state to form a dense airtight liquid adhesive layer on the surface of the metal matrix to protect the metal matrix.

Germany currently uses coating to protect rough billet when heating forging, so 2.5% of steel can be saved every year. According to the information from the former Soviet Union hammer and sickle Dnepr special steel plant, etc., in the heating before rolling, coating is used to protect X15H5 steel billet, and the metal consumption coefficient in the plant is reduced by 25-30%, besides, the steel surface rolling quality is improved; for some easily oxidized steel, rolling leads to formation of ferric oxide scale, and 30~70% of the steel surface has to be cleaned. In the heating before rolling, use of protection coatings can reduce the oxidation burning loss to $1/10$~$1/30$, and significantly reduces the decarbonization and improves the steel surface quality, and also greatly reduces the amount of labor of clean-up and waste rate.

Nowadays, a general steel production process transports billets after the continuous casting to the reheating furnace by track or pulls the billets into the track with an insulation cart, and then put the billets into the furnace for reheating. Before being put into the furnace, all the billets are maintained at a temperature of 800° C.-1000° C. and red hot. The existent anti-oxidation spraying process is generally suitable for spraying or brushing of the steel billet at room temperature, and the steel billet is heated in furnace after being dried at room temperature; this process normally exists in enterprises purchasing steel billets then hot-rolling them, but now the majority of steel enterprises have adopted the hot delivery technology, the existing spraying of anti-oxidation coating at room temperature is not suitable for the steel billet under the hot delivery process conditions. It is impossible for the metallurgical enterprises to cool the billet from the hot state to the room temperature before operation just for spraying anti-oxidation coating, because viewed from the aspect of energy waste, the anti-oxidation is of little significance. The existing coating spraying equipment is a simple manual wall coating spraying equipment, and it is difficult to be used in high-temperature environment. Hence, the coating spraying equipment and spraying method involved in the existing steel anti-oxidation coating does not match the actual steel rolling production process because of being limited by the film formation by spraying, brushing and drying at room temperature and the static high temperature protection, thus the promotion of the anti-oxidation spraying technology is limited.

Therefore, it is necessary to provide an anti-oxidation spraying method and spraying equipment to meet the needs of anti-oxidation spraying of steel billet under the conditions of high temperature in the steel hot rolling process.

SUMMARY

The example methods and apparatus described herein provide an anti-oxidation spraying method for steel billets, capable of anti-oxidation spraying of steel billets under the condition of high temperature, thereby reducing the oxidation burning loss of steel billets.

Also, the example methods and apparatus described herein provide an anti-oxidation spraying equipment for steel billets, capable of in-line anti-oxidation spraying of steel billets under the condition of high temperature, thereby reducing the oxidation burning loss of steel billets.

Yet another example described herein provides a method of an anti-oxidation spray for a steel billet, wherein the billet of 400° C.-1000° C. enters the predetermined spraying region, a plurality of anti-oxidation spraying devices are used to perform an anti-oxidation spray on the billet in two or more directions, thereby forming directly an anti-oxidation coating on the steel billet at 400° C.-1000° C.

In some examples, the plurality of spraying devices can perform an anti-oxidation spray on the steel billet from the top, the bottom and the two sides.

In some examples, a method includes a billet position detection step. In the step, when the billet arrives at the predetermined spraying region, a spraying signal is transmitted; when the billet leaves the predetermined spraying region, a stop spraying signal is transmitted. According to the spraying signal or stop spraying signal, the spraying devices carry out the anti-oxidation spray on the billet which arrives at the predetermined spraying region or stop the spray.

In some example methods, before spraying the billet, a purge step is included for the billet surface to clean floating dust or other foreign matter so as to facilitate the subsequent spraying of the anti-oxidation coating.

In some example methods, after the spraying of steel billet and before the steel enters into the furnace, a supplementary spraying step is further included for the lower surface of the billet so as to repair the worn oxidation coating on the bottom surface of the billet during transportation.

In some examples, a method further includes a washing step for the spraying device, in which nozzle and pipeline of the spraying device are washed alternately by gas and water when the spraying device stops spraying.

In some examples, a method also includes a flue gas treatment step, in which when the spraying device carries out an anti-oxidation spray, the flue gas formed during the spraying process will be sucked into the flue and exhausted after being subjected to waste gas treatment.

In some examples, a method also includes a position adjustment step for the spraying device. In the step, the positions of multiple spraying devices can be regulated in accordance with the size of the billet, and the distance of the spray nozzles of the spraying devices with respect to the corresponding surface of the billet to be sprayed can be controlled so as to guarantee a full and uniform formation of an anti-oxidation coating on the surface of the billet.

In some examples, a method also includes a cooling step for the spraying device to avoid the coating being deposited on the spraying device under the high-temperature state and to make the coating transported fluently.

In some examples, a method further includes a waste liquid recycling and treatment step, in which the waste liquid produced during spraying and flue gas treatment process are recycled and treated.

In some examples, an example apparatus includes an anti-oxidation spraying equipment for the billet, which includes a plurality of spraying devices mounted near the predetermined spraying region, the spraying devices are set to be capable of an anti-oxidation spray on the billet in two or more directions when the billet at 400° C.-1000° C. enters into the predetermined spraying region, so as to directly form an anti-oxidation coating on the billet at 400° C.-1000° C.

In some examples, a spraying equipment includes an upper spraying device which sprays coating to the billet from the top, a lower spraying device which sprays coating to the billet from the bottom and a lateral spraying device which sprays coating from both sides of the billet, respectively.

In some examples, a spraying equipment also includes a supplementary spraying device which carries out a supplementary spray to the bottom surface of the billet which has been sprayed in the predetermined spraying region so as to repair the worn oxidation coating on the lower surface of the billet during transportation.

In some examples, a spraying equipment also includes a coating device used for storing or preparing coating in order to supply coating to the spraying device and supplementary spraying device.

In some examples, a coating device includes coating preparation tanks and coating agitation tanks connected to the coating preparation tanks through pipelines.

In some examples, a spraying equipment also includes a gas supply device. The spraying device and supplementary-spraying device include nozzles directed towards the predetermined spraying region. The nozzles are connected to the coating device and the gas supply device through pipelines so as to supply coating and high-pressure gas therethrough. The nozzles implement a dynamic high-temperature spraying through atomization of gas-liquid two-phase flow.

An example equipment described herein also includes a control device for controlling the work state of the spraying device.

In some examples, a spraying equipment also includes a gas supply device and a water supply device, to which the nozzles of the spraying devices are connected through pipelines, so that the nozzles and spraying pipelines can be washed with gas and water alternatively by the control device that controls the gas supply device and the water supply device.

In some examples, a spraying equipment also includes a position detection device for the billet, which can send a spraying signal to the control device and the control device will control the spraying device to carry out anti-oxidation spray when the detection device detects that the billet arrives at the predetermined spraying region, when the detection device detects that the billet leaves the region, the detection device can send a stop spraying signal to the control device and the control device will control the spraying device to stop spraying.

In some examples, a position detection device for the billet is a shooting device.

In some examples, a spraying equipment also includes a high-pressure gas purge device disposed in front of the predetermined spraying region for purging the billet surface before the billet being sprayed, so that the floating dust or other foreign matters on the surface of the billet will be removed to facilitate the subsequent spraying of the anti-oxidation coating.

In some examples, a spraying equipment includes a gas supply device, and the high-pressure gas purge device includes a gas nozzle connected to the gas supply device through a pipeline.

In some examples, a spraying equipment also includes a smoke hood installed over the predetermined spraying region, an induced draft fan connected to the smoke hood and a flue gas treatment device connected to the induced draft fan through the flue so that the gas produced during spraying process will be sucked into the flue by the induced draft fan, and exhausted after being treated through the waste gas treatment device.

In some examples, a spraying equipment also includes a position adjusting device for adjusting position of the spraying device. The position adjusting device can adjust the positions of the spraying devices in accordance with the size of the billet so as to control the distance between the nozzles of the spraying devices and the corresponding sprayed surface.

In yet another example, a spraying equipment is disposed with a vertical rack at the side of the predetermined spraying region, on which there is rotatably and pivotably provided a cantilever, the upper spraying device is disposed on the cantilever, and the rack is also disposed with a height adjusting mechanism for adjusting the up-and-down position of the cantilever so as to adjust the height of the upper spraying device by this height adjusting mechanism. In this example, the smoke hood can also be connected to the cantilever, the upper spraying device is located inside the smoke hood, so that the upper spraying device and smoke hood leave the predetermined spraying region for on-line examination and repair by enabling the cantilever to rotate on the rack; and through the height adjustment, the height of the upper spraying device and the smoke hood can be adjusted at the same time.

In some examples, each side of a predetermined spraying region includes a lateral spraying bracket. The lateral spraying device is set on the bracket, on which are provided a height adjusting device for adjusting the up-and-down height of the lateral spraying device and a length adjusting device for adjusting the length of the lateral spraying device extending from the lateral spraying bracket. The lateral spraying bracket is disposed on a rail, and the lateral spraying bracket can slide on the rail so that the lateral spraying device is away from the spraying region for on-line examination and repair.

In some examples, a lower spraying device is disposed on a rail and can slide on the rail, and thus can leave the spraying region for on-line examination and repair when needed. The lower spraying device is disposed with a height adjusting device, which can adjust the distance between the lower spraying device and the corresponding spray surface of the billet.

In some examples, a supplementary spraying device is disposed on a rail and can slide on the rail, and thus can leave the spraying region for on-line examination and repair when needed. The supplementary spraying device is disposed with a height adjusting device, which can adjust the distance between the supplementary spraying device and the corresponding spray surface of the billet.

In some examples, a spraying equipment further includes a cooling device for cooling the spraying device to avoid the coating being deposited on the spraying device under the high-temperature state and to make the coating transported fluently. As an alternative example, a cooling device may be a water-cooling device, including a cooling water tank to accommodate the spraying device therein, and the cooling water tank is connected to a water supply device so as to circulate cooling the spraying device by cooling water.

In some examples, a spraying equipment further includes a heat insulation device for heat insulating or protecting the spraying device.

In some examples, a spraying equipment further includes a discharged liquid tank arranged below the predetermined spraying region and the supplementary spraying device.

In some examples, the example methods and apparatus described herein perform an anti-oxidation spray on the billet at the temperature of 400° C.-1000° C. in the predetermined spraying region from several directions using multiple spraying devices, form a high-temperature anti-oxidation coating on the billet surface under high temperature, so as to change the process for other coating, which needs to cool the billet from about 800° C. to the room temperature and then dry the billet and raise the temperature, so this invention is applicable directly to the on-line high temperature spray demand of the hot delivery process directly transporting the billet from the continuous casting machine to the heating furnace in the present billet manufacture process, thus saving energy to a large extent, reducing oxidation burning loss during the heating process, and producing an evident effect from the angle of energy saving, improving production and efficiency in metallurgy production. Experiment proves that by using the high-temperature spraying method and equipment of this invention, the oxidation burning loss of billets can be reduced by at least 50%. Take for example the output of crude steel of 272 million tons produced by China in 2004, calculated in 3% of the total oxidation rate, the oxidation burning loss is about 8.16 million tons, which is equal to an annual output of a large-scale steel plant. If the example methods and equipments described herein are used, the oxidation burning loss of billets can be reduced by at least 50%, so an approximate statistics shows that more than 4 million tons of crude steel can be increased, calculated according to 0.8 ton of standard coal consumed per ton of steel, 3.2 million tons of standard coal can be saved, and calculated according to consumption of water of $15M^3$ per ton of steel, 60 million tons of industrial water can be saved, if calculated according to RMB 300 per ton of steel billet, 12 billion of economic benefit can be increased every year.

DESCRIPTION OF THE FIGURES

FIG. 9 illustrates an example schematic side view of a structure of a rail described herein;

FIG. 10 illustrates a plan view of the schematic side view of FIG. 9

FIG. 11 illustrates a sectional view of the structure of FIG. 10 taken along line A-A.

DETAILED DESCRIPTION

Figure 1:
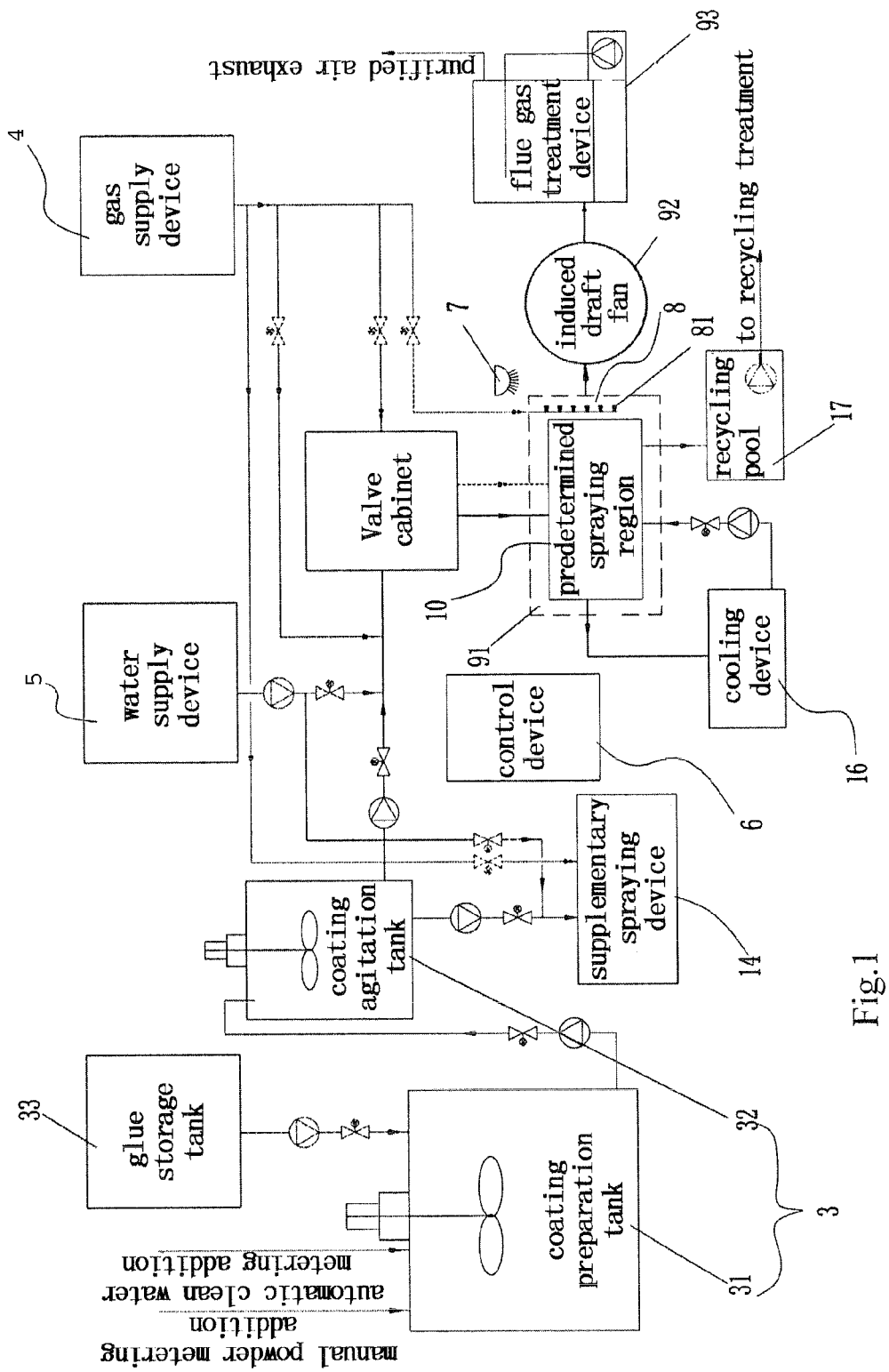
FIG. 1 illustrates an example process flow-chart of an example spraying equipment described herein.
Figure 2:
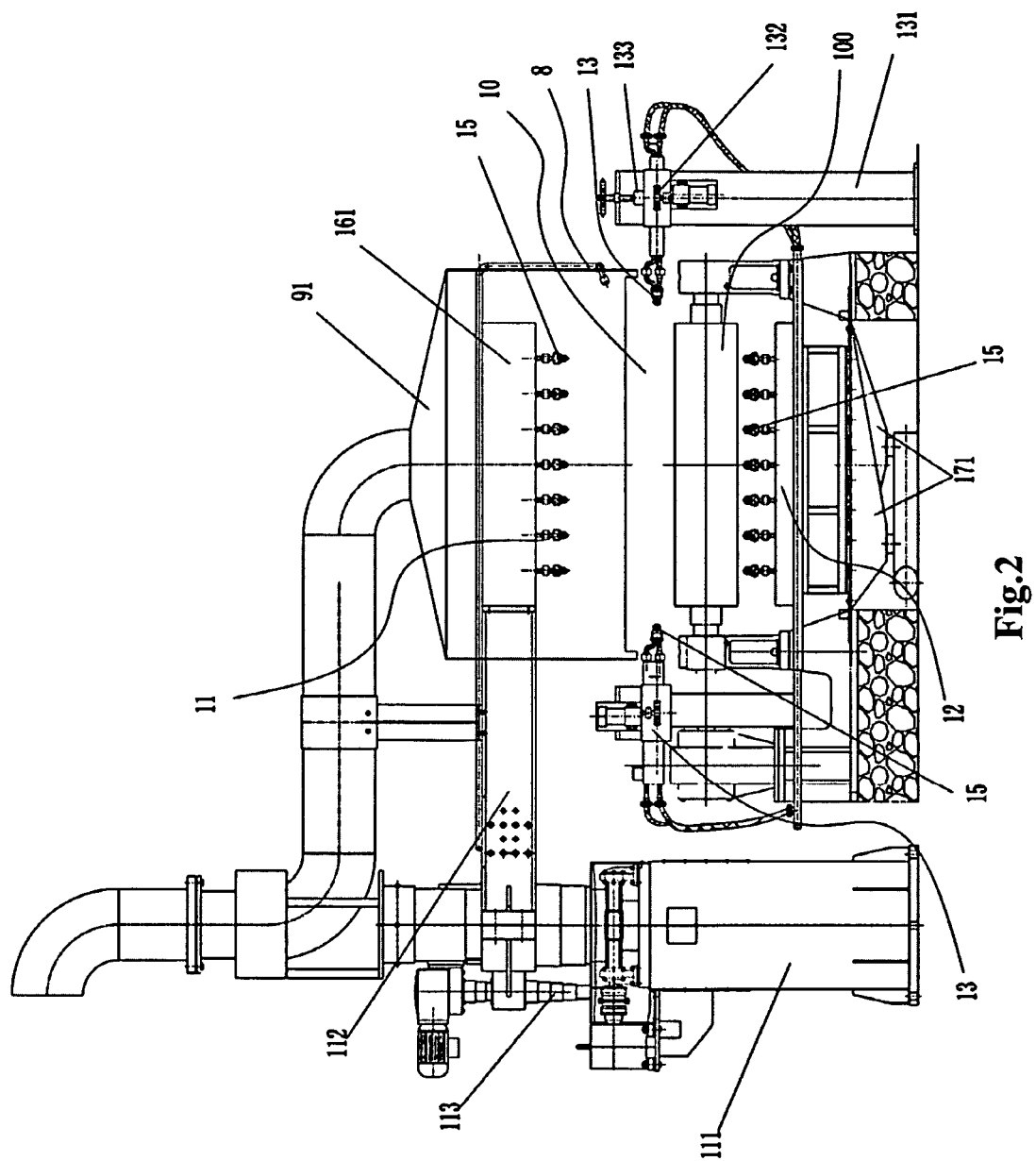
FIG. 2 illustrates a schematic front view of a structure of the example spraying equipment of FIG. 1.
Figure 3:
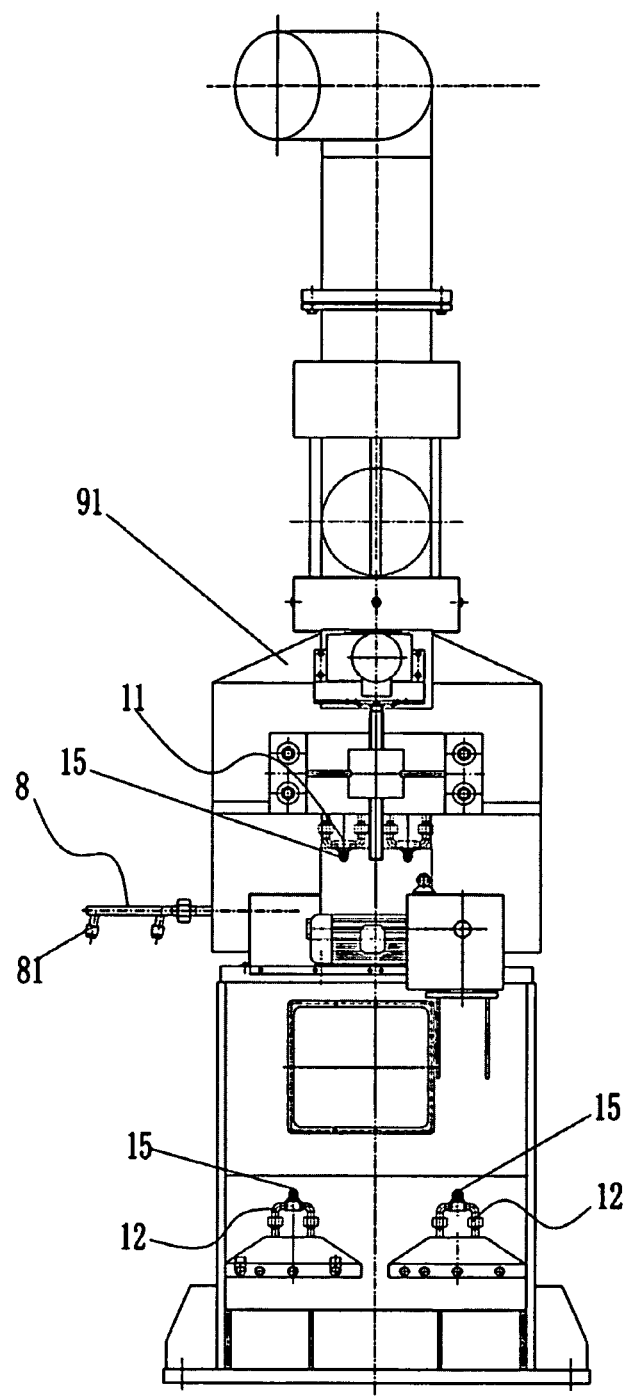
FIG. 3 illustrates a schematic side-view of the structure of the example spraying equipment of FIGS. 1 and 2.
Figure 4:
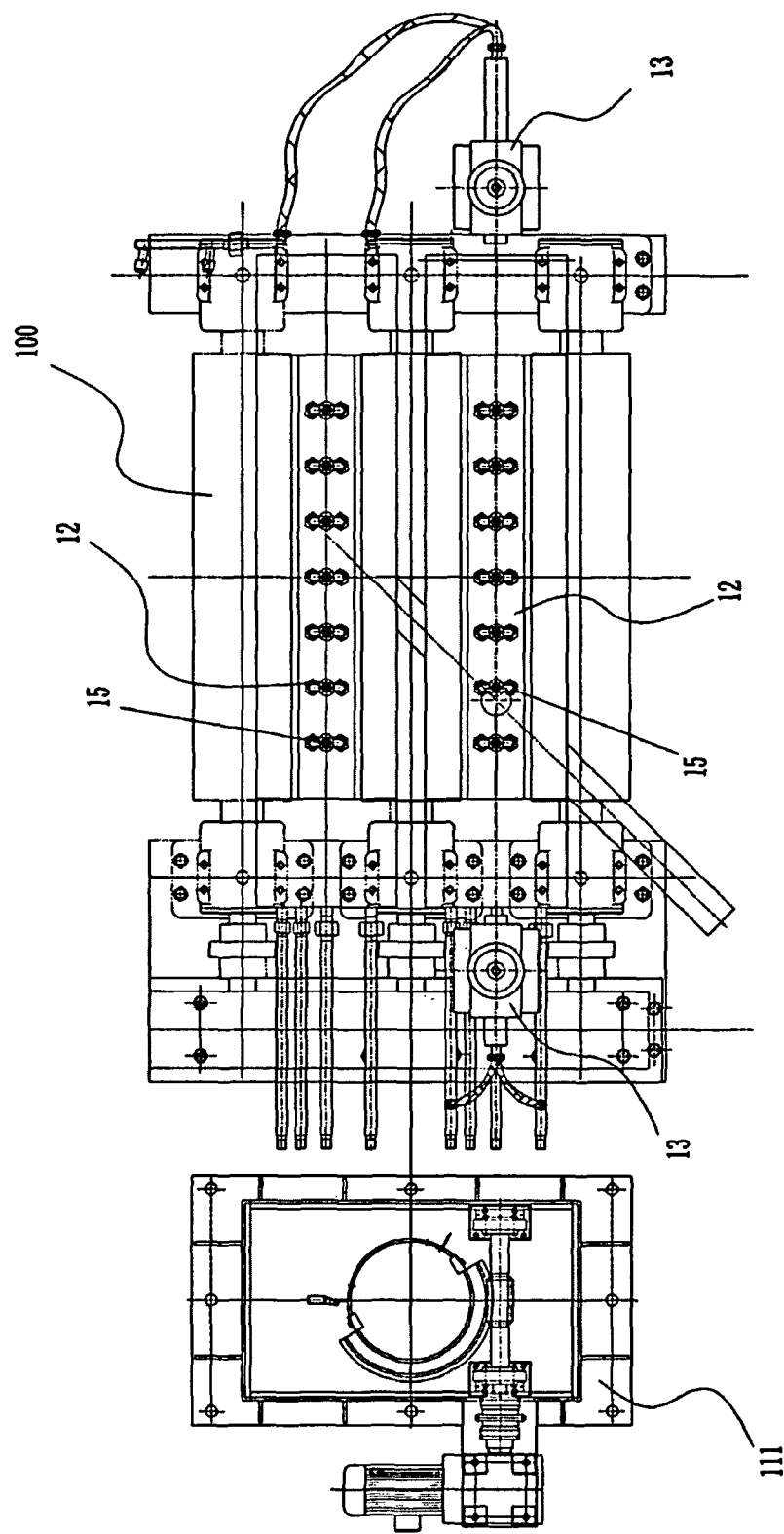
FIG. 4 illustrates a plan view of the structure of the example spraying equipment of FIGS. 1, 2, and 3 after removing the smoke hood and upper spraying device.
Figure 5:
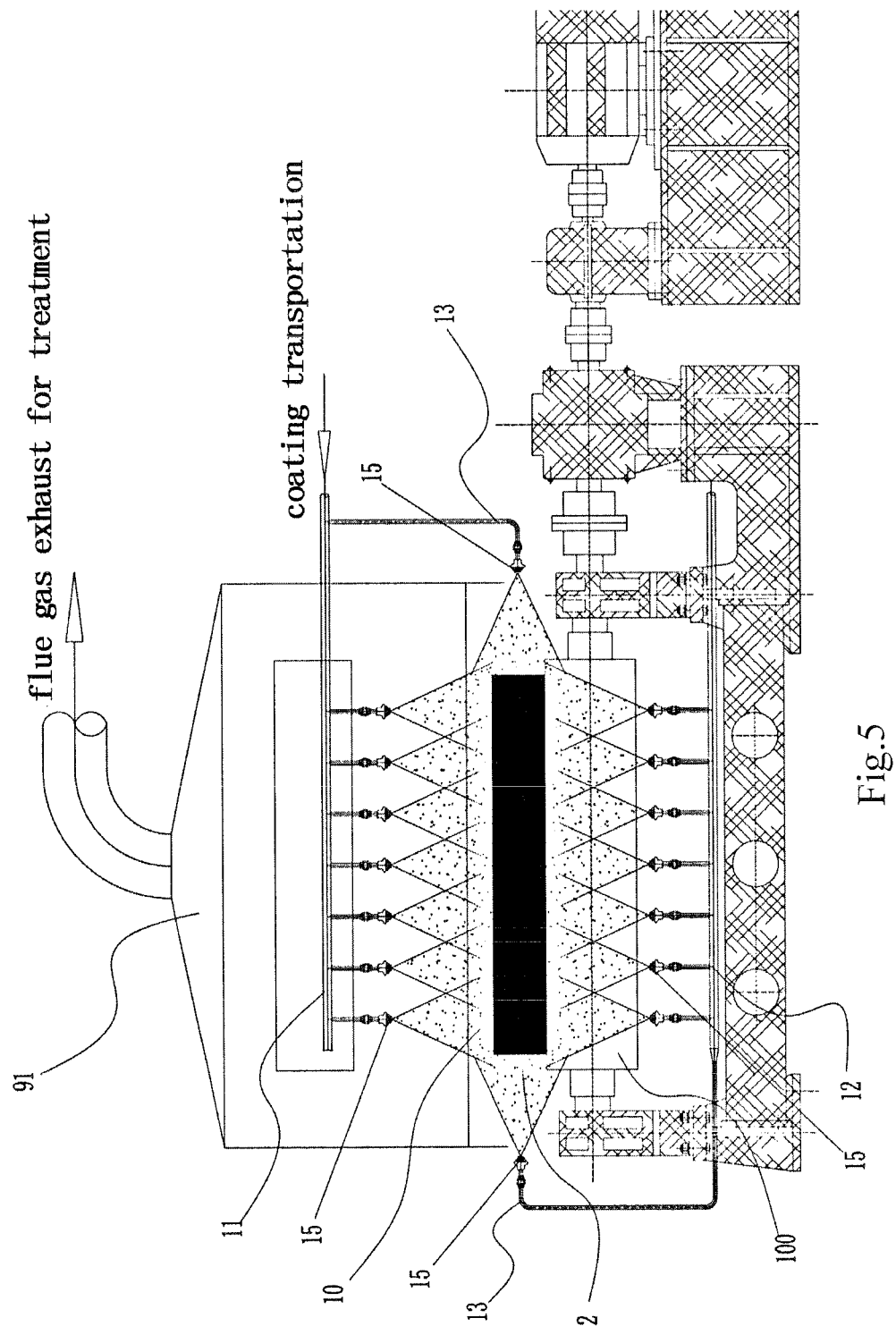
FIG. 5 illustrates an example schematic diagram of a spraying state of the example spraying equipment described herein.

As shown in FIGS. 1-6, in an example anti-oxidation spraying method for billet described herein, the billet 2 under the temperature of 400° C.-1000° C. enters the predetermined spraying region 10, a plurality of anti-oxidation spraying devices are used to carry out an anti-oxidation spraying on the steel billet 2 in two or more directions, so as to directly form an anti-oxidation coating on the billet 2 while the billet 2 is at a temperature of between approximately 400° C.-1000° C. The anti-oxidation spraying equipment includes a plurality of spraying devices disposed adjacent or near the predetermined spraying region 10. In the illustrated example, the billet 2 enters the predetermined spraying region 10 when a temperature of the billet 2 is between approximately 400° C.-1000° C. The anti-oxidation spraying can be carried out on the steel billet 2 in two or more directions, so as to directly form an anti-oxidation coating on the billet 2 when the temperature of the billet 2 is between approximately 400° C.-1000° C. As shown in FIGS. 2 and 5, the predetermined spraying region 10 may be located on the transport belt 100 of the billet 2 so as to perform the anti-oxidation spraying on the billet 2 in-line as the billet 2 is transported or moved along the belt 100.

The anti-oxidation spraying method and spraying equipment for billet described herein, due to directly forming an anti-oxidation coating on the billet 2 at a high temperature of 400° C.-1000° C., can be directly applied to the hot delivery process of the present steel billet manufacture process from the continuous casting machine directly transporting to the heating furnace so as to avoid the existing process of lowering the high-temperature billet to the room temperature for coating and then drying the billet and raising temperature, thus save energy to a large extent, and reduce oxidation burning loss of billet 2 during the heating process.

In this example, as shown in FIG. 5, the spraying equipment may include an upper spraying device 11 for spraying coating to the steel billet 2 from the top, and a lower spraying device 12 for spraying coating to the steel billet 2 from the bottom, and a lateral spraying device 13 for spraying coating to the steel billet 2 from both sides, so as to spray on the steel billet 2 from the top, the bottom and both sides, respectively by multiple spraying devices.

As shown in FIG. 1, in this example, after spraying on the billet 2 and before the billet 2 enters into the heating furnace, a supplementary spraying step to the lower surface of the billet 2 is included to repair the oxidation layer of the lower surface of the billet worn during the transportation. The spraying equipment of this invention includes a supplementary spraying device 14 disposed under the transportation device and in front of the opening of the heating furnace in order to perform a supplementary spray on the lower surface of the billet 2 after the billet being sprayed in the predetermined spraying region 10.

As shown in FIG. 1, the spraying equipment further includes a coating device 3 for storing and preparing coating so as to supply coating to the spraying device (upper spraying device 11, lower spraying device 12, lateral spraying device 13) and supplementary spraying device 14. The thick solid line in FIG. 1 shows the coating supply line between the coating device 3 and spraying devices 11, 12, 13 and the supplementary spraying device 14.

As shown in FIG. 1, as an alternative example, the coating device 3 includes a coating preparation tank 31 and a coating agitation tank 32 connected to the coating preparation tank 31 through pipelines. The coating preparation tank 31 may be disposed in the liquid coating preparation station, by adding powder, fresh water to the coating preparation tank 31 and injecting glue into the coating preparation tank 31 through the glue storage tank 33, high-temperature coating required for spraying is prepared in the coating preparation tank 31. The coating in the coating preparation tank 31 will be pumped into the coating agitation tank 32 in situ, and after agitating, pumped to the upper spraying device 11, lower spraying device 12, lateral spraying device 13 and supplementary spraying device 14 so as to perform an anti-oxidation spraying to the steel billet 2 through these spraying devices.

As shown in FIGS. 1-5, the spraying equipment further includes a gas supply device 4, the upper spraying device 11, lower spraying device 12, lateral spraying device 13 and supplementary spraying device 14 of the invention respectively includes a plurality of nozzles 15 directed towards the billet 2. These nozzles 15 are connected to the coating device 3 and gas supply device 4 respectively through pipelines so as to supply coating and high-pressure gas to the nozzles 15 through the coating device 3 and gas supply device 4. The nozzles 15 execute a dynamic high-temperature spraying on the billet 2 through gas-liquid two-phase flow atomization, and the gas-liquid two-phase flow is mixed at the nozzles 15, and the anti-oxidation coating is atomized into foggy fine particles by gas, and is sprayed uniformly to the surface of the billet 2 with an impacting force, so as to form a dense spray coating on the surface of the billet 2. Specifically, the nozzle 15 may use an external mixture atomizing nozzle. In order to make the spray pressures of all the nozzles 15 uniform, the method of grouped pressure-adjustment control can be used for these nozzles 15.

As shown in FIG. 1, the spraying equipment further includes a water supply device 5, to which all the above nozzles 15 can be connected through pipelines, so that these nozzles 15, after spraying operation, can be gas-liquid alternately washed by cleaning water supplied from the water supply device 5 and high-pressure gas supplied from the gas supply device 4 so as to avoid being deposited and ensure clear of the nozzles 15 and pipelines.

The example spraying equipment described herein further includes a control device 6 for controlling the working states of the spraying devices (including the upper spraying device 11, the lower spraying device 12, lateral spraying device 13 and supplementary spraying device 14). The control device 6 may include a plurality of control valves disposed on pipelines between the nozzles 15, the gas supply device 4, the coating device 3, and the water supply device 5, and include a control unit using PCL programming control, so as to control the working states (spraying, stop spraying, cleaning, etc.) of the spraying device through the control device 6. The control device 6 may also include some signal collecting elements (such as pressure sensor, flow sensor, liquid level detecting element, etc) so as to be capable of real-time displaying the liquid level of the coating preparation tank 31, spray pressure, spray instantaneous flow and accumulated flow, gas supply pressure and output pressure of the gas supply device 4, and liquid level and water pressure of the water supply device 5.

Figure 6:
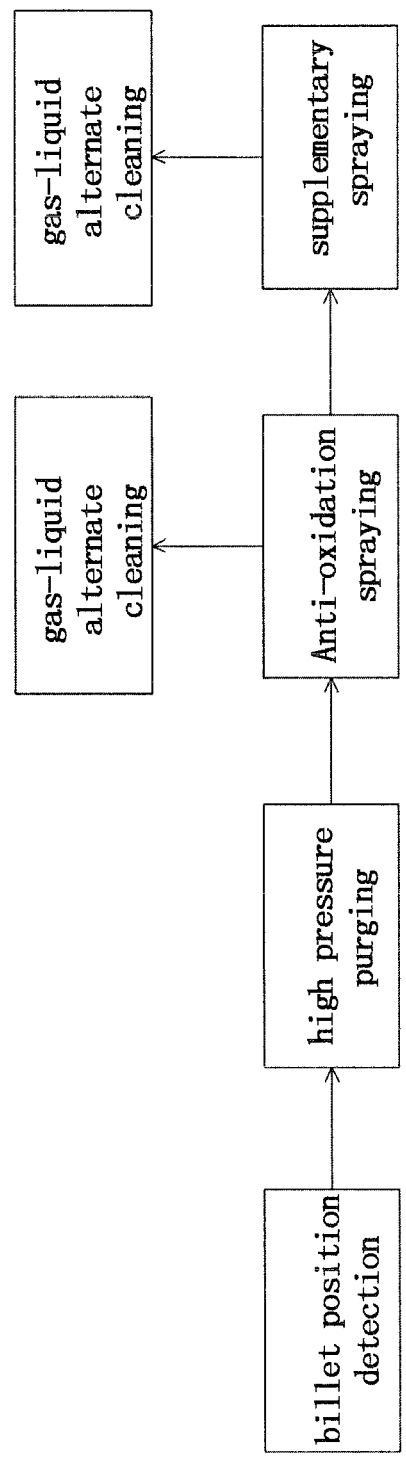
FIG. 6 illustrates an example spraying flow-chart diagram.

In this example, as shown in FIGS. 1, 6, the method includes a billet position detection step. In the step, when it is detected that the billet 2 arrives at the predetermined spraying region 10, a spraying signal is transmitted; when the billet 2 leaves the predetermined spraying region 10, stop spraying signal is transmitted. According to the spraying signal and stop spraying signal, the spraying devices carry out an anti-oxidation spray to the billet 2 which arrives at the predetermined spraying region or stop the spray. In the step, the billet position detection device 7 disposed in the spraying equipment can be used to detect the position of the billet 2, the billet position detection device 7 can transmit a spraying signal to the control device 6 when detecting that the billet 2 reaches the predetermined spraying region 10, and the control device 6 controls the spraying device to perform an anti-oxidation spray to the billet 2. The billet position detection device 7 can transmit a stop spraying signal to the control device 6 when detecting that the billet 2 leaves the predetermined spraying region 10, and the control device 6 controls the spraying device to stop the anti-oxidation spray. The billet position detection device 7 may be a position sensor or other detecting element. As a specific example, as shown in FIG. 1, the billet position detecting device 7 may be a shooting device.

As shown in FIG. 6, when the spraying device (upper spraying device 11, lower spraying device 12, lateral spraying device 13, supplementary spraying device 14) stops the anti-oxidation spray, the control device 6 can control the control valve on the pipelines to enable the water supply device 5 and gas supply device 4 to alternately supply cleaning water and high-pressure gas to the nozzle 15, so that the gas and liquid alternately cleans the nozzle 15 and spraying pipelines, keeps the pipeline system clean when the nozzle 15 is unused, and reduces jam probability for the nozzle 15. The gas-liquid alternate cleaning includes switching the control valve on the water pipelines and gas pipelines under the control of the control device 6 in the sequence of water cleaning—gas cleaning—water cleaning again, and the cleaning time may be determined upon practical needs. As a specific example, the cleaning time may be 5 seconds for water cleaning, 5 seconds for gas cleaning, and 5 seconds for water cleaning again, and the cleaning water may be transported in constant pressure and frequency conversion mode. When the cleaning finishes, a spray cycle in the predetermined spraying region 10 is complete.

In the example method, as shown in FIG. 6, before spraying the billet 2, a purge step is included for the billet surface 2 to clean floating dust or other foreign matters for facilitating the subsequent spraying of the anti-oxidation coating. As shown in FIGS. 1-3, in the spraying equipment of this invention, a high-pressure gas purge device 8 disposed in front of the predetermined spraying region 10 may be adopted to purge the surface of the billet 2. The high-pressure gas purge device 8 includes a gas nozzle 81 connected to the gas supply device 4 through pipelines. Before the billet 2 entering the predetermined spraying region 10, the control device 6 can control the control valve on the pipelines between the gas nozzle 81 and the gas supply device 4 to enable the gas supply device 4 to supply gas to the gas nozzle 81, so that the high-pressure gas sprayed from the gas nozzle 81 purges the surface of the billet 2.

The method described herein may also include a flue gas treatment step, in which when the spraying device carries out an anti-oxidation spray, the flue gas generated during the spraying process will be sucked into the flue and exhausted after being subjected to waste gas treatment. In order to treat the flue gas produced during the spray, as shown in FIG. 1, the spraying equipment comprises a smoke hood 91 installed over the predetermined spraying region 10, an induced draft fan 92 connected to the smoke hood 91 and a flue gas treatment device 93 connected to the induced draft fan 92 through a flue, so that the gas produced in the spray process is sucked into the flue by the induced draft fan 92 and exhausted after being subjected to flue gas treatment by the flue gas treatment device 93. The flue gas treatment device 93 can remove dust by neutralizing tower spray and neutralize the treatment liquid and flue gas.

Because the example anti-oxidation spray methods and spray equipment for steel billets relate to a direct anti-oxidation coating spray on the high-temperature steel billet, the anti-oxidation coating, after being sprayed onto the billet 2, needs to be solidified immediately to form a uniform anti-oxidation coating. For example, if the nozzle 15 is too close to the corresponding sprayed surface of the billet 2, the coating will flow on the surface of the billet 2, thus causing the spray to be nonuniform. If the nozzle 15 is too far away from the billet 2, the coating ejected by the nozzle 15 may be gasified before reaching the surface of the billet 2, and thus cannot form an anti-oxidation coating. Under such circumstances, the example methods described herein also include a position adjustment step for the spraying device. In this step, the position of the spraying devices can be adjusted in accordance with the size of the billet 2, and the distance from the nozzles 15 of the spraying devices to the corresponding sprayed surface of the billet 2 can be controlled so as to ensure a full and uniform formation of an anti-oxidation coating on the surface of the billet 2.

As shown in FIGS. 2-4, the example spraying equipment includes a position adjustment device. The position adjustment device enables adjustment of the spraying devices to control a distance between the spray nozzles 15 of the spraying devices and the corresponding surface of the billet 2.

As a specific example, as shown FIG. 2, the spraying equipment is disposed with a vertical rack 111 at the side of the predetermined spraying region 10, on the rack 111 being rotatably and pivotably provided a cantilever 112, the upper spraying device 11 being disposed on the cantilever 112, and the rack 111 is also disposed with a height adjusting mechanism 113 for adjusting the up-and-down position of the cantilever 12 so as to adjust the height of the upper spraying device 11 by this height adjusting mechanism 113. In this example, the smoke hood 91 can also be connected to the cantilever 112, the upper spraying device 11 is located inside the smoke hood 91 so that the upper spraying device 11 and smoke hood 91 leave the predetermined spraying region 10 for on-line examination and repair by enabling the cantilever 112 to rotate on the rack 111, and through the height adjustment mechanism 113, the height of the upper spraying device 1 and the smoke hood 91 can be adjusted at the same time so as to adapt to the height requirement for the billet 2 of different sizes.

Figure 7:
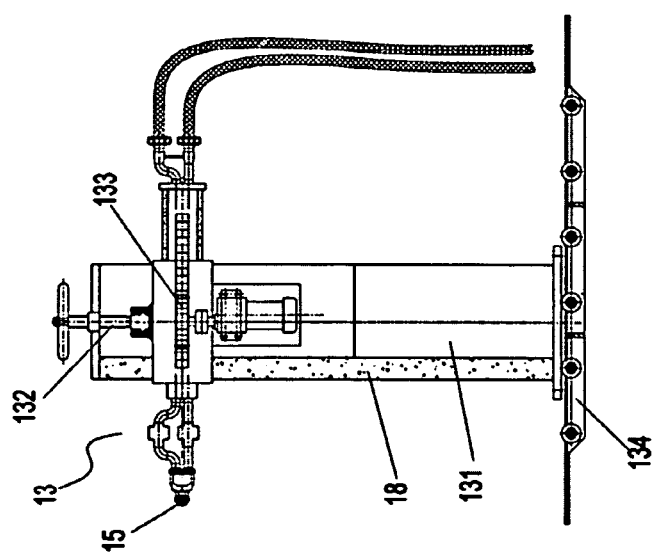
FIG. 7 illustrates an example schematic diagram of a structure of the lateral spraying device described herein.

As shown in FIGS. 2 and 7, on each side of the predetermined spraying region 10 there is provided a lateral spraying bracket 131. The lateral spraying device 13 is set on the lateral spraying bracket 131, on which are provided a height adjusting device 132 for adjusting the up-and-down height of the lateral spraying device 13 and a length adjusting device 133 for adjusting the length of the lateral spraying device 13 extending from the lateral spraying bracket 131. The length adjusting device 133 of the lateral spraying device 13 may adopt gear rack transmission, and use stroke switch to control the stroke so as to achieve the object of controlling the distance between the nozzle 15 and the sprayed surface of the billet 2, and meanwhile collaborating with the height adjustment by the height adjusting device 132 to adapt to the billet 2 of different specifications.

As shown in FIGS. 7 and 9-11, the lateral spraying bracket 131 may be disposed on a rail 134, and the lateral spraying bracket 131 is located at a position on the rail 134 desired for spraying through a fixture, when off-line examination and repair is needed, the fixture is released, the lateral spraying bracket 131 slides on the rail 134 so that the lateral spraying device 13 is away from the spraying region 10 for on-line examination and repair.

Figure 8:
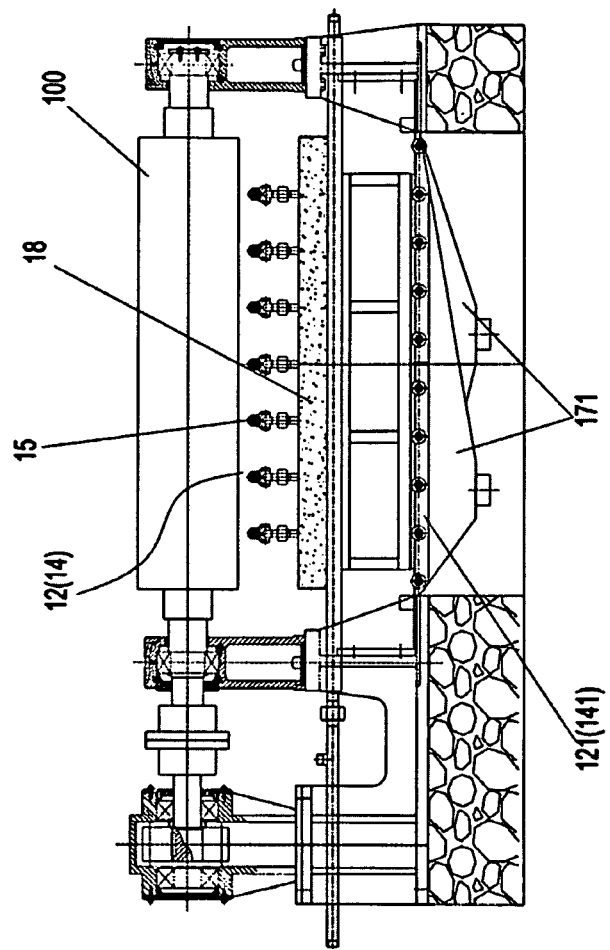
FIG. 8 illustrates an example schematic structure diagram of a lower spraying or supplementary spraying device described herein.

As shown in FIG. 8, the lower spraying device 12 is disposed on a rail 121, in normal working, the lower spraying device 12 is secured to the rail 121 through a fixture, when examination and repair is needed, the fixture is released, and the lower spraying device 12 slides on the rail 121 so that the lower spraying device 12 is away from the spraying region 10 for on-line examination and repair. The lower spraying device 12 may also be disposed with a height adjusting device, which can adjust the distance between the lower spraying device 12 and the corresponding sprayed surface of the billet 2.

As shown in FIG. 8 (the supplementary spraying device 14 has a structure basically the same as the lower spraying device 12, so explained by reference to FIG. 8), the supplementary spraying device 14 is disposed on a rail 141, in normal working, the supplementary spraying device 14 is secured to the rail 141 through a fixture, when examination and repair is needed, the fixture is released, and the supplementary spraying device 14 slides on the rail 141 so that the supplementary spraying device 14 is away from the spraying region 10 for on-line examination and repair. The supplementary spraying device 14 may also be disposed with a height adjusting device, which can adjust the distance between the supplementary spraying device 14 and the corresponding sprayed surface of the billet 2.

The specific structures of the height adjusting device and length adjusting device in this invention may adopt any one of the existing position adjusting structures, such as gear rack structure, screw nut adjusting structure, turbo-worm structure, and so on, this invention does not restrict its specific structure so long as the position adjustment can be realized.

In order to avoid the coating being deposited on the spraying device under high temperature state and to make the coating transported fluently, the method described herein further comprises a cooling step for the spraying device. The example spraying device is cooled by disposing a cooling device 16. As an alternative example, the cooling device 16 may be a water cooling device, including a cooling water tank 161 to accommodate the spraying device therein, and the water cooling tank 161 is provided with an inlet tube and exit tube connected to a water supply device 5, so as to circularly cool the spraying device through recycling cooling water. Because hot gas usually evaporates upward in the spraying devices near the predetermined spraying region 10, the upper spraying device 11 is mostly affected by the heat of the billet 2. As shown in FIG. 2, the upper spraying device 11 adopts the above cooling device 16 for cooling, the nozzle 15 and spraying pipeline of the upper spraying device 11 are all installed inside the cooling water tank 161, and are always under recycle cooling state, so as to avoid the nozzle 15 and spraying pipeline of the upper spraying device 11 being deposited under high temperature, and ensure an anti-oxidation spray of the billet 2 under a high-temperature state. Of course, the lower spraying device 12, lateral spraying device 13 and supplementary spraying device 14 can also be cooled by the cooling device 16.

As shown in FIGS. 7 and 8, because the lower spraying device 12, lateral spraying device 13 and supplementary spraying device 14 are less affected by the heat, a heat insulating device 18 can be used for heat insulating protection of the spraying device to avoid or reduce the effect of the high-temperature billet 2 on the spraying device.

The example spraying method described herein also includes a waste liquid recycling and treating step, in which the waste liquid produced during spraying and flue gas treatment process are recycled and treated As shown in FIG. 1, in order to recycle waste liquid, the spraying equipment further comprises a liquid discharge tank 171 disposed under the predetermined spraying region 10 and the supplementary spraying device 14, the waste liquid enters a recycling pool 17 through the liquid discharge tank for a recycling treatment.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An anti-oxidation spraying equipment for a billet comprising:
   a plurality of spraying devices mounted adjacent a spraying region, the spraying devices to provide an anti-oxidation spray on the billet when the billet enters the spraying region to form an anti-oxidation coating on the billet, the anti-oxidation spray composed of a liquid-gas, two-phase mixture, the billet having a temperature between approximately 400° C. and approximately 1000° C. when the billet enters the spraying region;
   a first spraying device of the plurality of spraying devices to move in a first direction relative to the billet;

a second spraying device of the plurality of spraying devices to move in a second direction relative to the billet;

a third spraying device of the plurality of spraying devices to move in a third direction relative to the billet, the first direction being different than the second and third directions, and one of the first, second or third spraying devices being movable independently relative to another one of the first, second or third spraying devices; and a position adjustor to adjust respective positions of the first, second and third spraying devices relative to respective surfaces of the billet based on a size of the billet and the composition of the liquid-gas, anti-oxidation spray, the position adjustor to control respective spray distances between the respective spraying devices and respective surfaces of the billet to enable a uniform formation of the anti-oxidation coating on the surfaces of the billet to prevent gasification of the anti-oxidation spray and to prevent the anti-oxidation spray from flowing on the surface of the billet and causing a non-uniform anti-oxidation coating.

2. The anti-oxidation spraying equipment defined in claim 1, wherein the first spraying device comprises an upper spraying device to spray the anti-oxidation spray on a top surface of the billet, the second spraying device comprising a lower spraying device to spray the anti-oxidation spray on a bottom surface of the billet and the third spraying device comprising a lateral spraying device to spray the anti-oxidation spray on both sides of the billet.

3. The anti-oxidation spraying equipment defined in claim 1, wherein the spraying region is positioned between a continuous casting machine and a heating furnace, and further comprising a supplementary spraying device to be positioned downstream from the spraying region between the spraying region and the heating furnace, the supplementary spraying device to provide a supplementary spray on a bottom surface of the billet after the billet is sprayed in the spraying region to repair the anti-oxidation layer on the bottom surface of the billet worn during transportation of the billet along a transport line.

4. The anti-oxidation spraying equipment defined in claim 1, further comprising a coating device to store or prepare a coating.

5. The anti-oxidation spraying equipment defined in claim 4, wherein the coating device comprises a coating preparation tank and a coating agitation tank in fluid communication with the coating preparation tank.

6. The anti-oxidation spraying equipment defined in claim 5, further comprising a gas supply device, each of the spraying devices having a nozzle directed towards the spraying region, the nozzles being in fluid communication with the coating device and the gas supply device.

7. The anti-oxidation spraying equipment defined in claim 1, further comprising a control device to control the position adjustor and the spraying devices.

8. The anti-oxidation spraying equipment defined in claim 6, further comprising a control device to control the position adjustor and the spraying devices.

9. The anti-oxidation spraying equipment defined in claim 8, further comprising a pressure adjusting device disposed between the spraying devices and the gas supply device, the pressure adjusting device to adjust an ejection pressure of the spraying devices to enable a uniform ejection pressure at each nozzle of the first, second and third spraying devices.

10. The anti-oxidation spraying equipment defined in claim 8, further comprising a water supply device, the nozzles of the spraying devices being in fluid communication with the water supply device and the gas supply device to enable the nozzles and spraying pipelines to be washed with gas and water alternatively by the control device that controls the gas supply device and the water supply device.

11. The anti-oxidation spraying equipment defined in claim 7, further comprising a position detection device, the detection device to send a spraying signal to the control device when the detection device detects that the billet is positioned in the spraying region, the control device to control the spraying devices to spray the anti-oxidation spray on the billet when the billet is in the spraying region, the position detection device to provide a stop spraying signal to the control device when the position detection device detects that the billet is not in the spraying region, the control device to cause the spraying devices to stop spraying when the control devices receive the stop spraying signal.

12. The anti-oxidation spraying equipment defined in claim 11, wherein the position detection device comprises a sensor.

13. The anti-oxidation spraying equipment defined in claim 1, further comprising a high-pressure gas purge device positioned adjacent the spraying region to purge a surface of the billet prior to the surface being sprayed.

14. The anti-oxidation spraying equipment defined in claim 13, further comprising a gas supply device, the high-pressure gas purge device including a gas nozzle connected to the gas supply device through a pipeline.

15. The anti-oxidation spraying equipment defined in claim 1, further comprising a smoke hood installed over the spraying region, an induced draft fan connected to the smoke hood and a flue gas treatment device in communication with the induced draft fan through a flue, the gas produced during spraying to flow into the flue under the influence of the induced draft fan and to be exhausted after being treated through the flue gas treatment device.

16. The anti-oxidation spraying defined in claim 1, further comprising a position adjusting device to adjust respective positions of the spraying devices in accordance with a size of the billet to control respective distances between the nozzles of the spraying devices and the respective surfaces of the billet.

17. The anti-oxidation spraying equipment defined in claim 15, further comprising a rack adjacent the spraying region, the rack supporting a cantilever, the cantilever being rotatably and pivotably coupled relative to the rack, the upper spraying device coupled to the cantilever, the rack having a height adjusting mechanism to adjust a vertical position of the cantilever and the upper spraying device.

18. The anti-oxidation spraying equipment defined in claim 17, wherein the smoke hood is connected to the cantilever, the upper spraying device positioned inside the smoke hood so that the upper spraying device and smoke hood are pivotable away from the spraying region via the cantilever for in-line examination and repair, a position of the upper spraying device and the smoke hood are adjustable via the height adjustment mechanism.

19. The anti-oxidation spraying equipment defined in claim 2, further comprising a lateral spraying bracket to support the lateral spraying device, the lateral spraying bracket having a height adjusting device to adjust a first position of the lateral spraying device in a first direction and a length adjusting device to adjust a second position of the lateral spraying device in a second direction, the first direction being different than the second direction.

20. The anti-oxidation spraying equipment defined in claim 1, wherein the third spraying device is slidably coupled to a second rail to enable the third spraying device to move away from the spraying region for in-line repair, the second rail having a longitudinal axis of the second rail that is non-parallel relative to the axis of travel of the billet.

21. The anti-oxidation spraying equipment defined in claim 2, wherein the lower spraying device has a height adjusting device to adjust a distance between the lower spraying device and the second surface of the billet.

22. The anti-oxidation spraying equipment defined in claim 3, wherein the supplementary spraying device is slidably coupled to a second rail to enable the supplementary spraying device to be positioned away from the spraying region for in-line repair, the supplementary spraying device to move on the second rail in a direction along a longitudinal axis of the second rail that is non-parallel relative to a longitudinal axis of the transport line.

23. The anti-oxidation spraying equipment defined in claim 3, wherein the supplementary spraying device has a height adjusting device to adjust a distance between the supplementary spraying device and the bottom surface of the billet.

24. The anti-oxidation spraying equipment defined in claim 1, further comprising a cooling device to cool the spraying devices.

25. The anti-oxidation spraying equipment defined in claim 24, wherein the cooling device is a water cooling device, the water cooling device comprising a cooling water tank to accommodate the spraying devices therein, the water cooling tank is provided with an inlet tube and an outlet tube connected to a water supply device.

26. The anti-oxidation spraying equipment defined in claim 2, further comprising a heat insulating device to insulate the spraying devices from heat.

27. The anti-oxidation spraying equipment defined in claim 1, further comprising a liquid discharge tank adjacent the spraying region.

28. The anti-oxidation spraying equipment defined in claim 3, further comprising a liquid discharge tank adjacent the supplementary spraying device.

29. The anti-oxidation spraying equipment defined in claim 1,
wherein the plurality of spraying devices are positioned to spray the anti-oxidation coating on the billet while the billet has a temperature greater than 700° C. and less than 1000° C. while the billet is transported from a continuous casting machine to a heating furnace to reduce a cooling down period otherwise needed prior to application of the anti-oxidation spray.

30. The anti-oxidation spraying equipment defined in claim 1, wherein the spraying devices are coupled to a coating device and a gas supply device, the coating device and the gas supply device to provide a relatively high-pressure gas to the spraying devices.

31. The anti-oxidation spraying equipment defined in claim 30, wherein the coating device and the gas supply device are to provide a two-phase, gas-liquid flow atomization.

32. The anti-oxidation spraying equipment defined in claim 31, wherein the two-phase, gas-liquid flow is mixed at the spraying devices.

33. The anti-oxidation spraying equipment defined in claim 29, wherein the spraying devices are to apply the anti-oxidation spray to the billet after the billet exits the casting machine and prior to the billet entering the heating furnace.

34. The anti-oxidation spraying equipment defined in claim 33, further comprising a supplementary spraying device positioned downstream from the spraying devices to spray the anti-oxidation spray on at least one surface of the billet prior to the billet entering the heating furnace.

* * * * *